US009325473B2

(12) United States Patent
Lee et al.

(10) Patent No.: US 9,325,473 B2
(45) Date of Patent: *Apr. 26, 2016

(54) METHOD OF TRANSMITTING AND RECEIVING CONTROL INFORMATION IN A WIRELESS COMMUNICATION SYSTEM (71) Applicant: LG ELECTRONICS INC., Seoul (KR)

(72) Inventors: Young Dae Lee, Anyang-si (KR); Sung Duck Chun, Anyang-si (KR); Sung Jun Park, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/206,783

(22) Filed: Mar. 12, 2014

(65) Prior Publication Data

US 2014/0192748 A1 Jul. 10, 2014

Related U.S. Application Data

(63) Continuation of application No. 13/342,691, filed on Jan. 3, 2012, now Pat. No. 8,768,353, which is a continuation of application No. 12/438,318, filed as application No. PCT/KR2007/004012 on Aug. 22, 2007, now Pat. No. 8,155,648.

(60) Provisional application No. 60/823,247, filed on Aug. 22, 2006.

(30) Foreign Application Priority Data

Aug. 9, 2007 (KR) ........................ 10-2007-0080363

(51) Int. Cl.
*H04W 4/00* (2009.01)
*H04L 5/00* (2006.01)
(Continued)

(52) U.S. Cl.
CPC ............ *H04L 5/0053* (2013.01); *H04W 72/005* (2013.01); *H04W 72/042* (2013.01); *H04W 80/02* (2013.01)

(58) Field of Classification Search
CPC .................................................... H04W 72/005
See application file for complete search history.

(56) References Cited

U.S. PATENT DOCUMENTS 6,131,030 A  10/2000 Schon et al.
6,157,833 A  12/2000 Lawson-Jenkins et al.
(Continued)

FOREIGN PATENT DOCUMENTS

EP  1 148 753 A2  10/2001
EP  1 168 877 A1  1/2002
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN) Radio interface . . . ," Release 7, 3GPP TR 25.813, V7.0.0, Jun. 2006, pp. 1-39.
(Continued)

*Primary Examiner* — Shaq Taha
(74) *Attorney, Agent, or Firm* — Birch, Stewart, Kolasch & Birch, LLP (57) ABSTRACT

A method of transmitting or receiving control information in a wireless communication system is discussed. The method in one embodiment includes transmitting indication information including an MBMS related identifier to at least one user equipment; and transmitting control information which has been changed to the at least one user equipment after the transmission of the indication information, wherein the control information is transmitted via a multicast control channel (MCCH) and a multicast channel (MCH).

16 Claims, 6 Drawing Sheets

(51) Int. Cl.
*H04W 72/00* (2009.01)
*H04W 72/04* (2009.01)
*H04W 80/02* (2009.01)

(56) References Cited

U.S. PATENT DOCUMENTS

| | | |
|---|---|---|
| 6,324,171 B1 | 11/2001 | Lee et al. |
| 6,353,628 B1 | 3/2002 | Wallace et al. |
| 6,526,027 B1 | 2/2003 | Yeom |
| 6,725,267 B1 | 4/2004 | Hoang |
| 6,785,256 B2 | 8/2004 | O'Neill |
| 7,197,317 B2 | 3/2007 | Parkvall et al. |
| 7,400,636 B2 * | 7/2008 | Kim et al. .................. 370/401 |
| 7,457,588 B2 | 11/2008 | Love et al. |
| 7,551,643 B2 | 6/2009 | Yeo et al. |
| 7,899,451 B2 | 3/2011 | Hu et al. |
| 7,916,697 B2 | 3/2011 | Eklund |
| 8,427,997 B2 | 4/2013 | Ren et al. |
| 8,582,482 B2 | 11/2013 | Hsu |
| 8,582,487 B2 | 11/2013 | Gou et al. |
| 8,588,100 B2 | 11/2013 | Wei |
| 8,614,971 B2 | 12/2013 | Kim et al. |
| 2001/0044322 A1 | 11/2001 | Raaf |
| 2002/0028690 A1 | 3/2002 | McKenna et al. |
| 2002/0114294 A1 | 8/2002 | Toskala et al. |
| 2003/0007512 A1 | 1/2003 | Tourunen et al. |
| 2003/0123485 A1 | 7/2003 | Yi et al. |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2004/0014452 A1 | 1/2004 | Lim et al. |
| 2004/0028078 A1 | 2/2004 | Beckmann et al. |
| 2004/0117860 A1 | 6/2004 | Yi et al. |
| 2004/0121771 A1 | 6/2004 | Song et al. |
| 2004/0146019 A1 | 7/2004 | Kim et al. |
| 2004/0146067 A1 | 7/2004 | Yi et al. |
| 2004/0202107 A1 | 10/2004 | Bensimon et al. |
| 2004/0253959 A1 | 12/2004 | Hwang et al. |
| 2005/0041610 A1 | 2/2005 | Lee et al. |
| 2005/0041681 A1 | 2/2005 | Lee et al. |
| 2005/0058078 A1 | 3/2005 | Jung et al. |
| 2005/0094670 A1 | 5/2005 | Kim |
| 2005/0141462 A1 | 6/2005 | Aerrabotu et al. |
| 2005/0176474 A1 | 8/2005 | Lee et al. |
| 2005/0185620 A1 | 8/2005 | Lee et al. |
| 2005/0238051 A1 | 10/2005 | Yi et al. |
| 2005/0271007 A1 | 12/2005 | Hwang et al. |
| 2005/0288022 A1 | 12/2005 | Ryu et al. |
| 2006/0034335 A1 | 2/2006 | Karaoguz et al. |
| 2006/0056347 A1 | 3/2006 | Kwak et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0126554 A1 | 6/2006 | Motegi et al. |
| 2006/0165045 A1 | 7/2006 | Kim et al. |
| 2006/0245417 A1 | 11/2006 | Conner et al. |
| 2007/0024972 A1 | 2/2007 | Kuerz et al. |
| 2007/0060139 A1 | 3/2007 | Kim et al. |
| 2007/0165567 A1 | 7/2007 | Tan et al. |
| 2007/0177569 A1 | 8/2007 | Lundby |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0291728 A1 | 12/2007 | Dalsgaard et al. |
| 2007/0291729 A1 | 12/2007 | Dalsgaard et al. |
| 2007/0293224 A1 | 12/2007 | Wang et al. |
| 2008/0025263 A1 | 1/2008 | Pelkonen |
| 2008/0056273 A1 | 3/2008 | Pelletier et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2010/0278143 A1 | 11/2010 | Chun et al. |

FOREIGN PATENT DOCUMENTS

| | | |
|---|---|---|
| EP | 1 209 938 A1 | 5/2002 |
| EP | 1 304 898 A1 | 4/2003 |
| EP | 1 315 356 A2 | 5/2003 |
| EP | 1 318 632 A2 | 6/2003 |
| EP | 1 337 124 A2 | 8/2003 |
| EP | 1 372 310 A1 | 12/2003 |
| EP | 1 420 551 A2 | 5/2004 |
| EP | 1 501 328 A2 | 1/2005 |
| EP | 1 511 245 A2 | 3/2005 |
| EP | 1 720 373 A1 | 11/2006 |
| EP | 1720322 A1 | 11/2006 |
| JP | 6-6294 A | 1/1994 |
| JP | 2002-539686 A | 11/2002 |
| JP | 2003-504935 A | 2/2003 |
| JP | 2003-235064 A | 8/2003 |
| JP | 2005-354488 A | 12/2005 |
| JP | 2006-505979 A | 2/2006 |
| JP | 2006-67115 A | 3/2006 |
| JP | 2006-515737 A | 6/2006 |
| JP | 2009-540721 A | 11/2009 |
| JP | 2009-542100 A | 11/2009 |
| KR | 2001/0105240 A | 11/2001 |
| KR | 10-2003-0026924 A | 4/2003 |
| KR | 10-0383603 B1 | 5/2003 |
| KR | 10-2004-0039944 A | 5/2004 |
| KR | 10-2004-0048675 A | 6/2004 |
| KR | 10-2005-0008440 A | 1/2005 |
| KR | 10-2005-0027972 A | 3/2005 |
| KR | 10-2005-0073244 A | 7/2005 |
| KR | 10-2005-0096763 A | 10/2005 |
| KR | 10-2005-0100552 A | 10/2005 |
| KR | 10-2006-0024756 A | 3/2006 |
| RU | 2249917 C2 | 4/2005 |
| WO | WO 00/74416 A1 | 12/2000 |
| WO | WO 2004/043094 A2 | 5/2004 |
| WO | WO 2004/064272 A1 | 7/2004 |
| WO | WO 2005/048613 A1 | 5/2005 |
| WO | WO 2006/018670 A1 | 2/2006 |
| WO | WO 2006/075820 A1 | 7/2006 |
| WO | WO 2006/104344 A2 | 10/2006 |
| WO | WO 2006/109851 A1 | 10/2006 |
| WO | WO 2007/052888 A2 | 5/2007 |
| WO | WO 2007/078155 A2 | 7/2007 |
| WO | WO 2007/078172 A2 | 7/2007 |
| WO | WO 2007/078929 A2 | 7/2007 |
| WO | WO 2007/133034 A2 | 11/2007 |

OTHER PUBLICATIONS

"3rd Generation Partnership Project; Technical Specification Group Radio Access Network; Evolved Universal Terrestrial Radio Access (E-UTRA) Medium Access Control (MAC) Protocol Specifications", 3GPP TS 36.321, vol. 8.1.0, Mar. 1, 2008, pp. 1-28, XP050377617.

"3rd Generation Partnership Project; Technical Specification Group Radio Access Network; Medium . . . , " 3GPP TS 25.321, 3rd Generation Partnership Project (3GPP), Mobile Competence Centre; 650, Route Des Lucioles; F-06921 Sophia-Antipolis Cedex; France, Mar. 1, 2007, pp. 1-126, XP050367709.

"3rd Generation Partnership Project; Technical Specification Group Radio Access Network; Packet Data . . . ," 3GPP TS 25.323, Mobile Competence Centre; 650, Route Des Lucioles; F-06921 Sophia-Antipolis Cedex; France, Mar. 1, 2007, pp. 1-44, XP050367856.

"Requirements for redirection in E-UTRAN", 3GPP TSG-RAN WG2 Meeting #56-bis, Nokia, R2-070107, Sorrento, Italy, Jan. 15-19, 2007.

"UL Timing Control Related to Contention Resolution", Discussion and Decision, 3rd Generation Partnersip Project (3GPP Draft); R2-081607, vol. RAN WG2, Mar. 31 to Apr. 4, 2008, pp. 1-3, XP050139334.

Alcatel-Lucent, "Downlink Control Signaling and Multiplexing for VOIP," 3GPP TSG RAN WG1 Meeting #48bis, R1-071721, Jun. 26, 2007, pp. 1-4, XP-002460800.

Asustek: "Granularity consideration for variable RLC PDU sizes," 3GPP TSG-RAN WG2 Meeting #56bis, Sorrento, Italy, Jan. 15-19, 2007, R2-070336, pp. 1-3.

(56) References Cited

OTHER PUBLICATIONS

Bosch: "header compression signaling," TSG-RAN Wroking Group 2 (Radio layer 2 and Radio layer 3), Sophia Antipolis, Nov. 29-Dec. 3, 1999, XP050114120, pp. 1-2.
Catt et al., "Enhancement to Buffer Status 1-7 Reporting", 3GPP Draft, R2-071345, 3rd Generation Partnership Project (3GPP), vol. RAN EG2, No. St. Julian, Mar. 22, 2007, XP050134291, pp. 1-5.
Ericsson, "DRX and DTX in LTE_Active," TSG-RAN WG2 Meeting #52, Mar. 27-31, 2006, pp. 1-5, Tdoc R2-060967.
Gao et al., "Research on the Access Network and MAC Technique for Beyond 3G Systems," IEEE Wireless Communications, vol. 14, No. 2, Apr. 1, 2007, XP011184637, pp. 57-61.
IPWireless, Tdoc R2-052377, "Layer 2 functions for LTE", 3GPP TSG RAN WG2 #48bis, Cannes, France, Oct. 10-14, 2005.
LG Electronics Inc: "Contents of PDCP Status Report R2-07xxxx", 3GPP TSG-RAN WG2, 59, Oct. 8, 2007, pp. 1-3, XP002580785.
LG Electronics Inc: "PDCP retransmissions" 3GPP Draft; R2-073041 PDCP Retransmissions_V2, Aug. 16, 2007, XP050135778.
LG Electronics, Inc., "Support for VoIP over MAC-hs/ehs," 3GPP TSG-RAN WG2, #57bis, R2-071542, Apr. 2, 2007, XP-050134474.
Nokia Corporation, "MAC Header Format," 3GPP TSK-RAN WG2 Meeting #59bis, R2-073891, Oct. 1, 2007, XP-002602993.
NTT DOCOMO et al., "MAC PDU Structure for LTE", 3GPP Draft, R2-070280, vol. RAN WG2, No. Sorrento, Italy, Jan. 12, 2007, XP050133369, pp. 1-4.
PDCP Structure and Traffic Path 3GPP Draft; R2-073259, Aug. 16, 2007, XP050135985.
R2-050852 "Relative Buffer Status Reporting", 3GPP TSG RAN WG2 meeting#46bis Apr. 4-8, 2005, Beijing, China.
R2-070096, "MAC PDU Format for LTE", 3GPP TSG RAN WG2 #56bis Jan. 15-19, 2007, Sorrento, Italy.
Sammour et al., U.S. Appl. No. 60/863,185, filed Oct. 27, 2006.
Samsung Electronics Co., Ltd. Tdoc R2-070130, "Selective forwarding/retransmission during HO", 3GPP TSG-RAN2 Meeting #56bis, Sorrento, Italy, Jan. 15-19, 2007.
Samsung Electronics Co., Ltd., Tdoc R2-061829, "Re-use of PDCP SN at ARQ level", 3GPP TSG-RAN2 Meeting #53bis, Cannes, France, Jun. 27-30, 2006.
Samsung, "LTE Handover procedures, text proposal," 3GPP TSG-RAN3 Meeting #53, Tdoc R2-061338, Shanghai, China, May 8-12, 2006, 16 pages, XP050131278.
Samsung, "UL Timing Sync Procedure," 3GPP TSG RAN2#52, R2-0601006, Athens, Greece, Mar. 27-31, 2006, 4 pages, XP002434793.
U.S. Appl. No. 13/342,691, filed Jan. 3, 2012.
U.S. Appl. No. 13/476,697, filed May 21, 2012.

* cited by examiner

METHOD OF TRANSMITTING AND RECEIVING CONTROL INFORMATION IN A WIRELESS COMMUNICATION SYSTEM

CROSS-REFERENCE TO RELATED APPLICATIONS

This application is a Continuation of co-pending U.S. patent application Ser. No. 13/342,691 filed Jan. 3, 2012, which is a Continuation of U.S. patent application Ser. No. 12/438,318 filed May 8, 2009 (now U.S. Pat. No. 8,155,648), which is a national stage of PCT Application No. PCT/KR2007/004012 filed Aug. 22, 2007, which claims priority to Korean Patent Application No. 10-2007-0080363 filed Aug. 9, 2007 and to U.S. Provisional Application No. 60/823,247 filed Aug. 22, 2006. The contents of each of these applications are incorporated herein by reference.

BACKGROUND OF THE INVENTION

1. Field of the Invention

The present invention relates to a wireless communication system, and more particularly, to a method of transmitting and receiving control information for a specific service in a wireless communication system.

2. Discussion of the Related Art

A multimedia broadcast/multicast service (hereinafter, referred to as "MBMS") is to provide a streaming or background service to a plurality of user equipments by using a downlink dedicated MBMS bearer service. In a network, an MBMS bearer uses a point-to-multipoint wireless bearer service or a point-to-point wireless bearer service.

The MBMS is divided into a broadcast mode and a multicast mode. The MBMS broadcast mode is a service for transmitting multimedia data to all user equipments (UEs) within a broadcast area. The broadcast area refers to a region where the broadcast service is possible. On the other hand, the MBMS multicast mode is a service for transmitting the multimedia data to a specific user equipment group only within a multicast area. The multicast area refers to a region where the multicast service is possible.

A procedure of providing a specific MBMS from a network to a user equipment by using a multicast mode will be described below. First of all, user equipments which desire to receive the MBMS should undergo a subscription procedure. Subscription refers to establishing a relationship between a service provider and a user equipment. Also, the user equipments which desire to receive the MBMS should receive a service announcement provided by the network. The service announcement refers to providing the user equipments with a list of services to be provided and related information of the services.

Meanwhile, a user equipment which desires to receive the MBMS of the multicast mode should join a multicast group specifically. The multicast group refers to a group of user equipments which receive a specific multicast service, and joining refers to merging with a multicast group to receive the specific multicast service. The user equipment can notify the network through the above joining that it desires to receive specific multicast data. On the other hand, the user equipment which has joined the multicast group can unsubscribe to joining of the multicast group, which is referred to as leaving.

Each user equipment performs the subscription, joining and leaving procedures. The user equipment can perform the subscription, joining, and leaving procedures at any time, such as before data transmission, during the data transmission, or after the data transmission.

The MBMS can be divided into a multi-cell service and a single cell service, wherein the multi-cell service is to provide a service to a plurality of cells, and the single cell service is to provide a service to a single cell. The multi-cell service provides the service through a multicast channel (MCH), and the single cell service provides the service through a downlink shared channel (DL SCH). If the user equipment receives the multi-cell service through the MCH, the user equipment can receive the same multi-cell service transmitted from various cells by combining in an MBMS single frequency network (MBSFN) mode.

To provide the MBMS, the network provides MBMS control channel (MCCH) and MBMS traffic channel (MTCH). The MCCH is used to transmit control information for MBMS transmission to the user equipment while the MTCH is used to transmit the MBMS to the user equipment. The MBMS is comprised of one or more sessions, wherein only one session can exist during one time interval.

SUMMARY OF THE INVENTION

The network can conventionally transmit MBMS notification message through the MCCH to notify user equipments of a start of session of the MBMS or change of MBMS control information. The MCCH is transmitted through a semi-static radio resource. However, a problem occurs in this case. That is, since the MCCH is transmitted through such a semi-static radio resource, if there is any change in either a size of MCCH information or a radio channel, it is difficult to promptly respond to the change, whereby the radio resource is used inefficiently.

Accordingly, the present invention is directed to a method of transmitting and receiving control information in a wireless communication system, which substantially obviates one or more problems due to limitations and disadvantages of the related art.

An object of the present invention is to provide a method of transmitting and receiving control information in a wireless communication system to efficiently use radio resources.

Another object of the present invention is to provide a method of transmitting and receiving control information in a wireless communication system, in which certainty in receiving control information for a specific service is assured.

To achieve these objects and other advantages and in accordance with the purpose of the invention, as embodied and broadly described herein, a network includes a notification indicator channel and a control channel to notify change of control information of a specific service, thereby efficiently using a radio resource. An identifier corresponding to the service and transport information of the control channel to which the control information is transmitted are transmitted through the notification indicator channel.

In another aspect of the present invention, a user equipment which receives the specific service from the network receives the notification indicator channel, and receives the control channel using the transport information if the above identifier corresponds to an identifier stored in the user equipment.

Preferably, the identifier is a service identifier or service group identifier for identifying the service, or a session identifier or session group identifier for identifying a session of the service. The user equipment does not receive the control channel if the above identifier does not correspond to an identifier stored in the user equipment.

Preferably, the notification indicator channel is an L1/L2 control channel or a physical downlink control channel (PDCCH).

Preferably, the transport information is information included in the control channel which transmits the control information or the notification message which notifies the control information, and includes establishment of modulation/coding for transmission of the control channel corresponding to a transport time of the notification indicator channel, resource block, time frame, HARQ information, etc.

Preferably, the user equipment which has received the notification indicator channel receives the notification message through the control channel if the identifier is included in the notification indicator channel. If a specific transport time of the control information is designated in the notification message, the user equipment receives the control channel in the designated specific time.

In still another aspect of the present invention, a method of transmitting control information for a specific service in a wireless communication system which uses multiple carriers comprises transmitting notification indication information to at least one user equipment, the notification indication information including information related to a channel resource region through which control information for the specific service is transmitted, and transmitting a notification message to the at least one user equipment through the channel resource region indicated by the information related to the channel resource region, the notification including control information.

In further still another aspect of the present invention, a method of receiving control information for a specific service in a wireless communication system which uses multiple carriers comprises receiving notification indication information from a network, the notification indication information including information related to a channel resource region through which control information for the specific service is transmitted, and receiving a notification message from the network by using the notification indication information, the notification including control information.

BRIEF DESCRIPTION OF THE DRAWINGS

FIG. 3A and FIG. 3B illustrate a structure of a radio interface protocol between a user equipment (UE) and E-UTRAN, in which

DETAILED DESCRIPTION OF THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to E-UMTS (Evolved Universal Mobile Telecommunications System).

Figure 1:
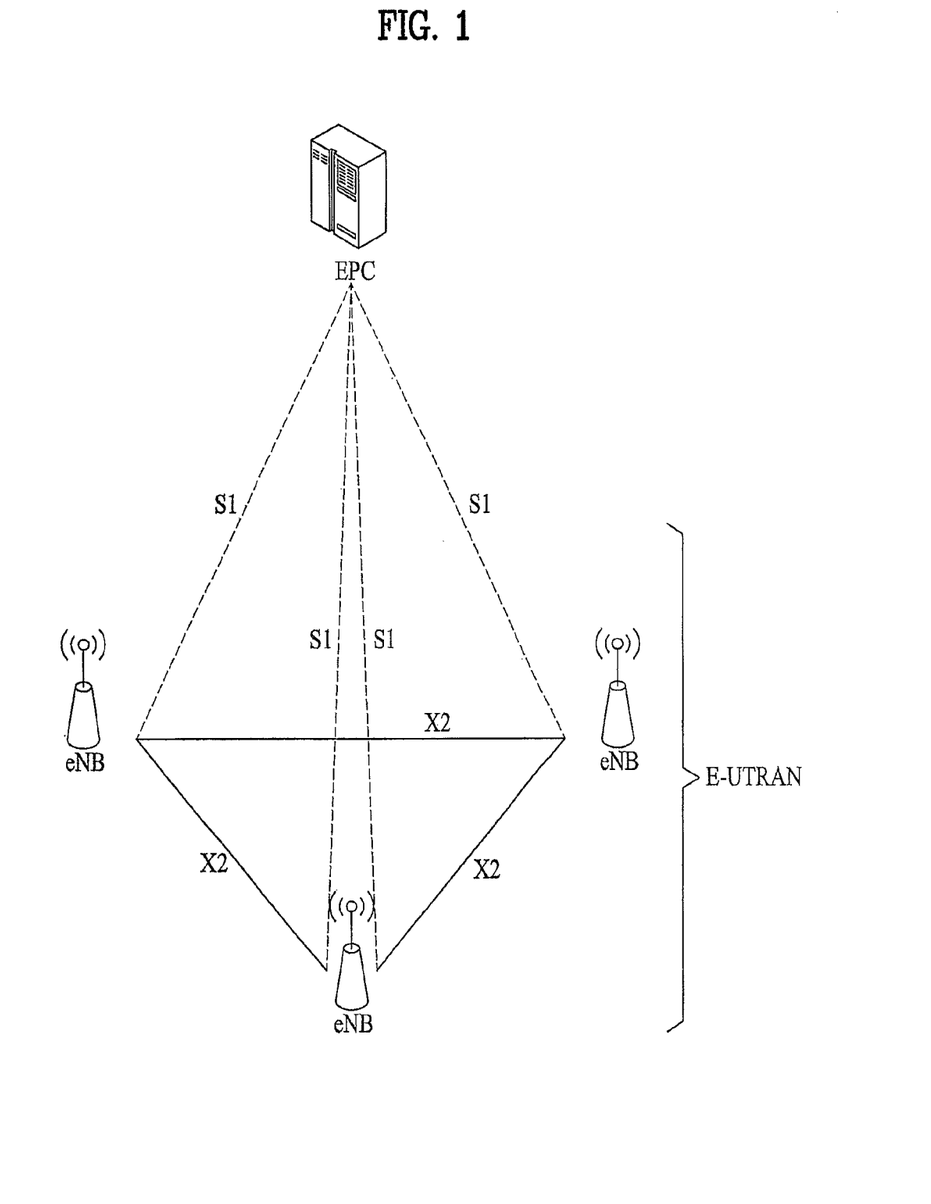
FIG. 1 illustrates a network structure of an E-UMTS (Evolved-Universal Mobile Telecommunications System)

FIG. 1 illustrates a network structure of an E-UMTS. An E-UMTS is a system evolving from the conventional WCDMA UMTS and its basic standardization is currently handled by the 3GPP ($3^{rd}$ Generation Partnership Project). The E-UMTS can also be called an LTE (Long Term Evolution) system. Release 7 and Release 8 of 3GPP technical specifications ($3^{rd}$ Generation Partnership Project; Technical Specification Group Radio Access Network) can be referred to obtain detailed information about the UMTS and E-UMTS.

Referring to FIG. 1, an E-UTRAN includes base stations (hereinafter, referred to as 'eNode B' or 'eNB'), wherein respective eNBs are connected with each other through X2 interface. Also, each of eNBs is connected with a user equipment (UE) through a radio interface and connected with EPC (Evolved Packet Core) through S1 interface. The EPC comprises MME (Mobility Management Entity) and a SAE (System Architecture Evolution) gateway.

Layers of a radio interface protocol between a UE and a network can be classified into a first layer L1, a second layer L2 and a third layer L3 based on three lower layers of OSI (open system interconnection) standard model widely known in communication systems. A physical layer belonging to the first layer L1 provides an information transfer service using a physical channel. A radio resource control (hereinafter, abbreviated as 'RRC') located at the third layer plays a role in controlling radio resources between the UE and the network. For this, the RRC layer enables RRC messages to be exchanged between the UE and the network. The RRC layer can be distributively located at network nodes including Node B, an AG and the like or at either the Node B or the AG.

Figure 2:
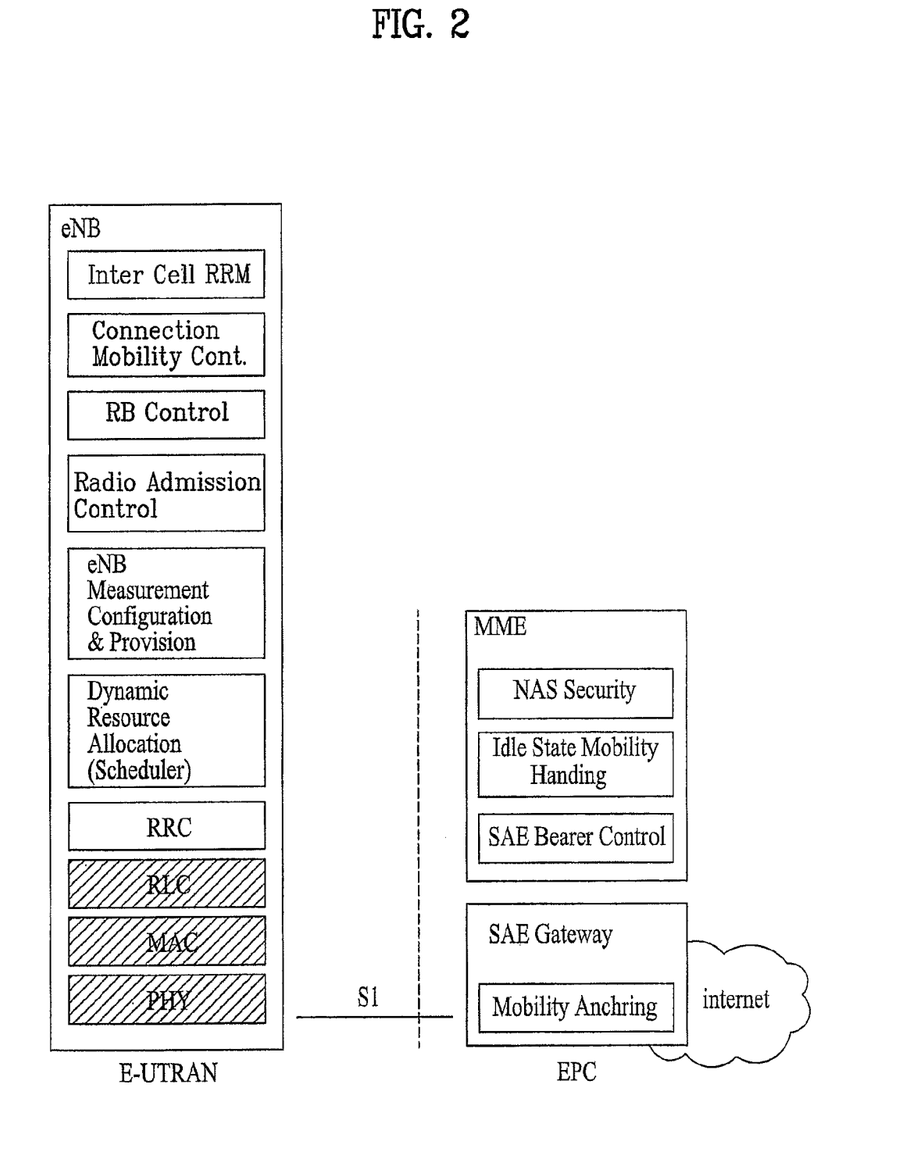
FIG. 2 is a schematic view illustrating an E-UTRAN (UMTS terrestrial radio access network)

FIG. 2 is a schematic view illustrating an E-UTRAN (UMTS terrestrial radio access network). In FIG. 2, a hatching part represents functional entities of a user plane and a non-hatching part represents functional entities of a control plane.

Figure 3A:
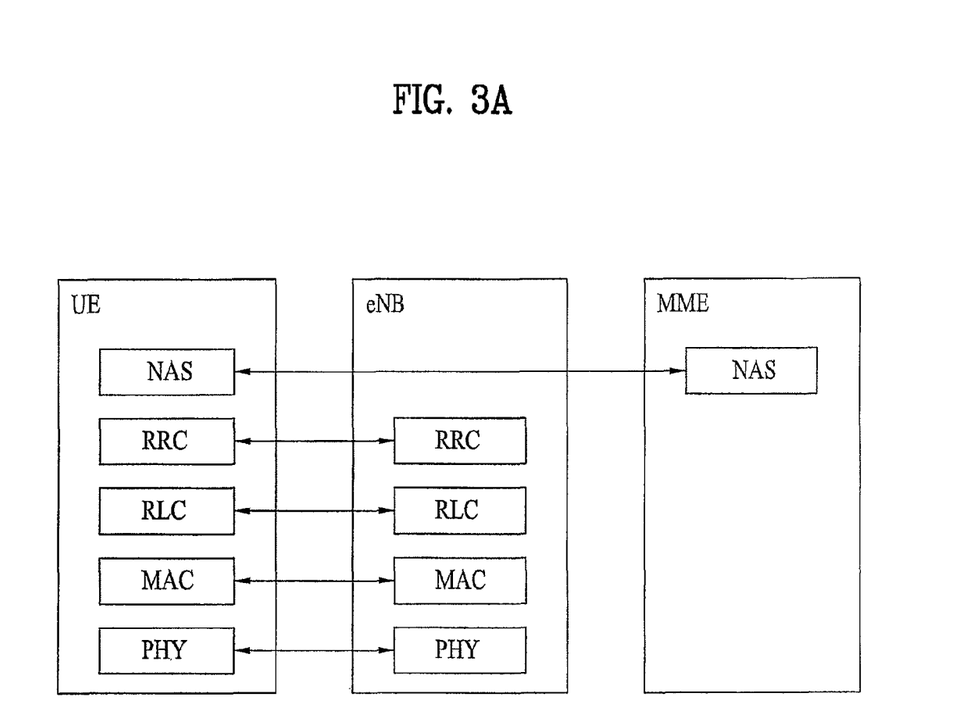
FIG. 3A is a schematic view of a control plane protocol and FIG. 3B is a schematic view of a user plane protocol.
Figure 3B:
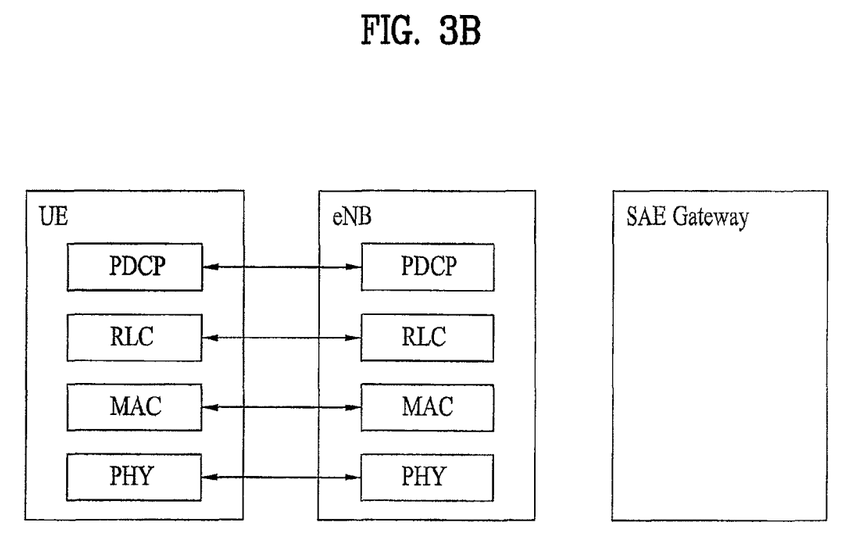

FIG. 3A and FIG. 3B illustrate a structure of a radio interface protocol between the user equipment (UE) and the E-UTRAN, in which FIG. 3A is a schematic view of a control plane protocol and FIG. 3B is a schematic view of a user plane protocol. Referring to FIG. 3A and FIG. 3B, a radio interface protocol vertically includes a physical layer, a data link layer, and a network layer and horizontally includes a user plane for data information transfer and a control plane for signaling transfer. The protocol layers in FIG. 3A and FIG. 3B can be classified into L1 (first layer), L2 (second layer), and L3 (third layer) based on three lower layers of the open system interconnection (OSI) standard model widely known in the communications systems.

The physical layer as the first layer provides information transfer service to an upper layer using physical channels. The physical layer (PHY) is connected to a medium access control (hereinafter, abbreviated as 'MAC') layer above the physical layer via transport channels. Data are transferred between the medium access control layer and the physical layer via the transport channels. Moreover, data are transferred between different physical layers, and more particularly, between one physical layer of a transmitting side and the other physical layer of a receiving side via the physical channels. The physical channel of the E-UMTS is modulated according to an orthogonal frequency division multiplexing (OFDM) scheme, and time and frequency are used as radio resources.

The medium access control (hereinafter, abbreviated as 'MAC') layer of the second layer provides a service to a radio link control (hereinafter, abbreviated as 'RLC') layer above the MAC layer via logical channels. The RLC layer of the second layer supports reliable data transfer. In order to effectively transmit IP packets (e.g., IPv4 or IPv6) within a radio-communication period having a narrow bandwidth, a PDCP layer of the second layer (L2) performs header compression to reduce the size of a relatively-large IP packet header containing unnecessary control information.

A radio resource control (hereinafter, abbreviated as 'RRC') layer located on a lowest part of the third layer is defined in the control plane only and is associated with configuration, reconfiguration and release of radio bearers (hereinafter, abbreviated as 'RBs') to be in charge of controlling the logical, transport and physical channels. In this case, the RB means a service provided by the second layer for the data transfer between the UE and the UTRAN.

As downlink transport channels carrying data from the network to UEs, there are provided a broadcast channel (BCH) carrying system information, a paging channel (PCH) carrying paging message, and a downlink shared channel (SCH) carrying user traffic or control messages. The traffic or control messages of a downlink multicast or broadcast service can be transmitted via the downlink SCH or an additional downlink multicast channel (MCH). Meanwhile, as uplink transport channels carrying data from UEs to the network, there are provided a random access channel (RACH) carrying an initial control message and an uplink shared channel (UL-SCH) carrying user traffic or control message.

As logical channels located above the transport channels and mapped with the transport channels, there are provided a broadcast channel (BCCH), a paging control channel (PCCH), a common control channel (CCCH), a multicast control channel (MCCH), and a multicast traffic channel (MTCH).

In the E-UMTS system, an OFDM is used on the downlink and a single carrier frequency division multiple access (SC-FDMA) on the uplink. The OFDM scheme using multiple carriers allocates resources by unit of multiple sub-carriers including a group of carriers and utilizes an orthogonal frequency division multiple access (OFDMA) as an access scheme.

A physical layer of an OFDM or OFDMA scheme divides active carriers into a plurality of groups and transmits respective groups to different receiving sides. Radio resource allocated to each UE which is defined by a time-frequency region on a two-dimensional sphere comprises continuous sub-carriers. A time-frequency region in the OFDM or OFDMA scheme is a rectangular form sectioned by time and sub-carrier coordinates. In other words, one time-frequency region could be a rectangular form sectioned by at least one symbol on a time axis and sub-carriers on a frequency axis. Such a time-frequency region can be allocated to an uplink for a specific UE, or an eNB can transmit the time-frequency region to a specific UE in a downlink. In order to define such a time-frequency region on the two-dimensional sphere, the number of OFDM symbols and the number of continuous sub-carriers starting from a point having an offset from a reference point should be given.

The E-UMTS which is currently being discussed uses 10 ms radio frame comprising 20 sub-frames. Namely, a sub-frame has a length of 0.5 ms. A resource block comprises one sub-frame and twelve sub-carriers, each of which is 15 kHz. One sub-frame comprises a plurality of OFDM symbols and a part (for example, first symbol) of the plurality of OFDM symbols can be used for transmission of L1/L2 control information.

Figure 4:
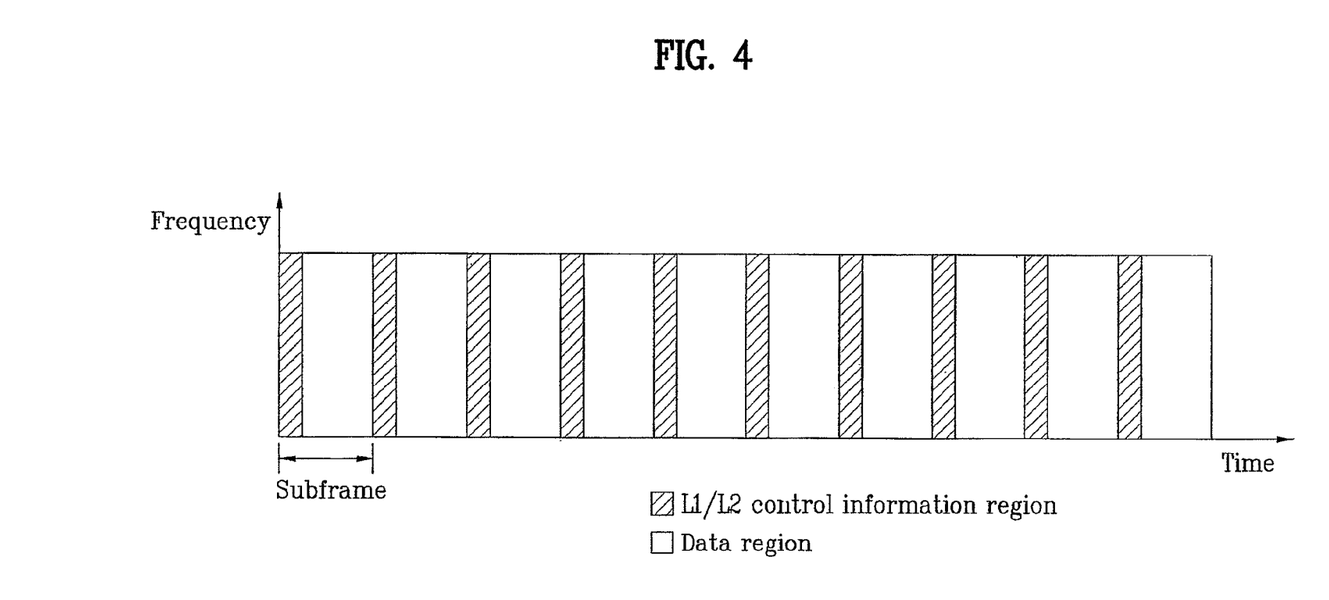
FIG. 4 illustrates an example of a structure of physical channels used in an E-UMTS system.

FIG. 4 is a diagram illustrating a structure of physical channels used in the E-UMTS. In FIG. 4, a sub-frame comprises an L1/L2 control information transmission region (the hatching part) and a data transmission region (the non-hatching part).

Figure 5:
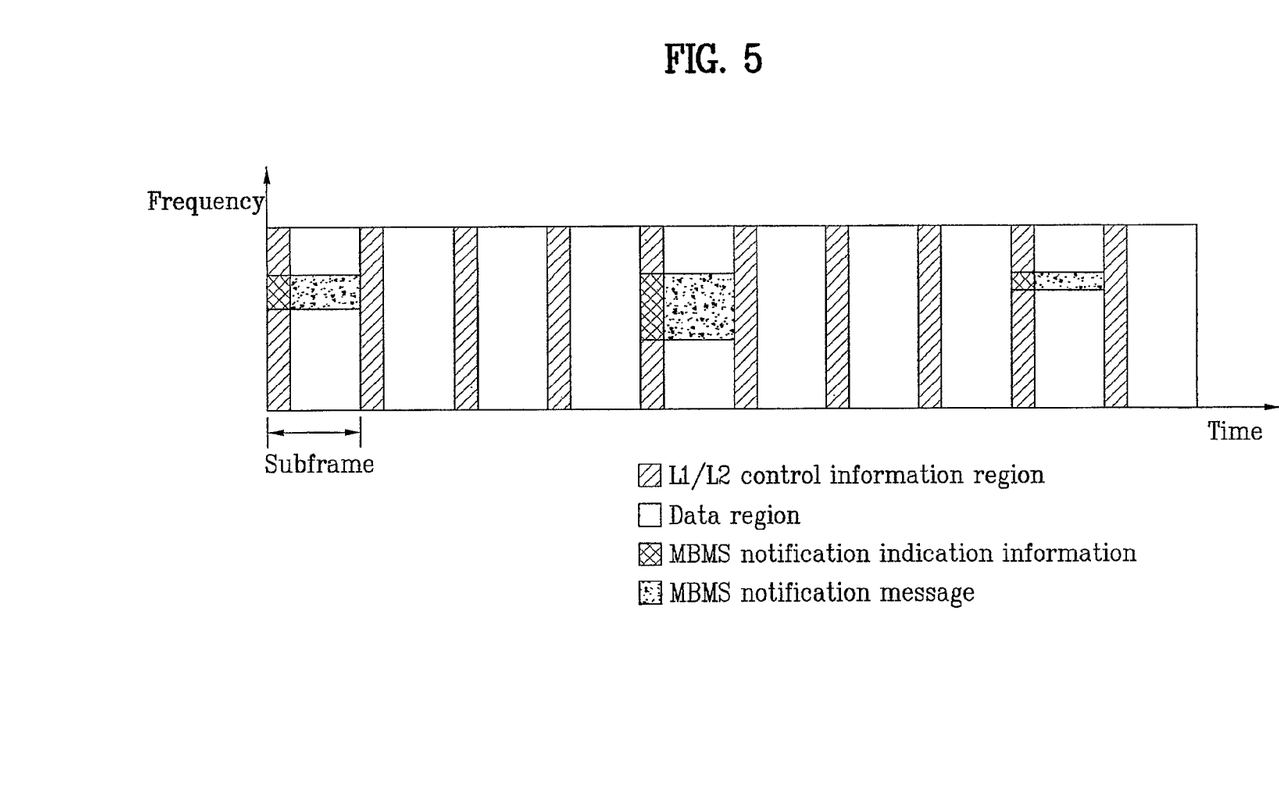
FIG. 5 illustrates a frame structure in an E-UMTS system according to the embodiment of the present invention.

FIG. 5 illustrates a frame structure in the E-UMTS system according to the embodiment of the present invention. In FIG. 5, E-UMTS network provides a specific MBMS service to at least one user equipment.

Referring to FIG. 5, the E-UMTS network transmits an MBMS notification message to a user equipment if control information for the specific MBMS service is changed or a session of the specific MBMS service starts or stops. Also, the E-UMTS network transmits MBMS notification indication information to the user equipment to previously notify that the MBMS notification message is transmitted. As shown in FIG. 5, the MBMS notification indication information can be transmitted through a L1/L2 control information region, and the MBMS notification message can be transmitted through a data region.

The MBMS notification message may include identification information (identifier) of the MBMS, control information which has been changed, and information about start and stop of a session or start of counting. The MBMS notification indication information may include an MBMS identifier or an MBMS group identifier and indication information of channel resource region (for example, a position of resource blocks allocated to the MBMS notification message on a frame), through which the MBMS notification message is transmitted. The resource block allocated to the MBMS notification message is a two-dimensional region on a time-frequency plane and can be expressed by a sub-carrier offset, the number of sub-carriers, a symbol offset, and the number of symbols.

As described above, in the OFDM or OFDMA system, the radio resource allocated to each UE is defined by a two-dimensional time-frequency region, and is a set of continuous sub-carriers. In the OFDM or OFDMA system, one time-frequency region is a rectangular form determined by time and sub-carrier coordinates. In other words, one resource block could be a rectangular form sectioned by at least one symbol on a time axis and a plurality of sub-carriers on a frequency axis.

The MBMS notification indication information may further include transport format indication information (for example, a coding scheme, a modulation scheme, or HARQ information, etc.) of the MBMS notification message. The MBMS notification indication information may also notify a size of a protocol data unit (PDU) which includes the MBMS notification message. The MBMS notification message is transmitted through the MCCH which is a logical channel, wherein the MCCH channel can be transmitted on MCH or DL SCH which is a transport channel. The number of resource blocks allocated to the MBMS notification message is determined by the size of the MBMS notification message.

The user equipment which has received the MBMS stores an identifier corresponding to the received service. The user equipment periodically receives the L1/L2 control channel which transmits the MBMS notification indication information or non-periodically receives the same channel if a predetermined event occurs. The user equipment of an idle mode receives the L1/L2 control channel periodically, i.e., at a receiving period of a paging message. The user equipment of an RRC connection mode receives the L1/L2 control channel periodically, i.e., at a DRX period or MBMS dedicated period, wherein the service can be broadcasted through system information.

The user equipment receives the MBMS notification indication information through the L1/L2 control channel. If the MBMS identifier included in the received MBMS notification indication information is the same as or corresponds to the MBMS identifier stored in the user equipment, the user equipment receives the MCH or the DL SCH using information included in the MBMS notification indication information, wherein the MBMS notification message is transmitted on the MCH or the DL SCH. In other words, the user equipment receives the MCH or the DL SCH, through which the MBMS notification message is transmitted, using channel resource region indication information (for example, time frame, resource block, etc.), transport format indication information (for example, a coding scheme, a modulation scheme, HARQ information, etc.) and a PDU size, which are included in the MBMS notification indication information.

If the MBMS notification message is transmitted through the MCH, the user equipment can identify an allocated channel resource region and transport format information through system information or the MCCH, wherein the MCH is transmitted through the designated channel resource region. At this time, if the MBMS identifier included in the L1/L2 control channel is the same as or corresponds to the MBMS identifier stored in the user equipment, the user equipment receives the MCH using transport format information through the designated channel resource region.

The MBMS notification indication information can notify as to whether a transport channel, which is to be received to acquire control information or MBMS notification message for the MBMS, is MCH or DL SCH. The user equipment can receive the MBMS notification message or control information by receiving the MCH or DL SCH in accordance with the MBMS notification indication information.

Furthermore, the E-UMTS network can notify as to whether the transport channel, which is to be received to acquire control information for the MBMS through the MBMS notification message, is the MCH or the DL SCH. For example, the user equipment receives the MBMS notification message through the DL SCH in accordance with the MBMS notification indication information. If the MBMS notification message notifies a specific MCH for the MBMS, the user equipment receives the control information through the corresponding MCH. If the MBMS notification message notifies a specific DL SCH for the MBMS, the user equipment receives the control information through the corresponding DL SCH.

According to the present invention, the wireless communication system can efficiently use the radio resource, and the user equipment can assure certainty in receiving control information for a specific service.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention can be applied to a wireless communication system such as a mobile communication system or a wireless internet system.

What is claimed is:

1. A method of transmitting control information for a multimedia broadcast/multicast service (MBMS) in a wireless communication system, the method comprising:

transmitting indication information including an MBMS related identifier to at least one user equipment through an L1/L2 control channel; and transmitting control information which has been changed to the at least one user equipment after the transmission of the indication information, wherein the control information is transmitted via a multicast control channel (MCCH) and a multicast channel (MCH).

2. The method of claim 1, wherein the MCCH is a logical channel and the MCH is a transport channel.

3. The method of claim 1, wherein the control information is transmitted through a data region.

4. The method of claim 1, wherein the indication information further includes resource information through which the control information is transmitted.

5. The method of claim 4, wherein the indication information further includes a transport format indication of the control information.

6. The method of claim 1, wherein the control information is transmitted to the at least one user equipment through resources designated by system information.

7. The method of claim 1, the indication information is periodically transmitted to the at least one user equipment.

8. The method of claim 1, wherein the MBMS related identifier is an MBMS identifier or an MBMS group identifier.

9. A method of receiving control information for a multimedia broadcast/multicast service (MBMS) in a wireless communication system, the method comprising:

receiving indication information including an MBMS related identifier from a network through an L1/L2 control channel; and receiving control information which has been changed from the network after the reception of the indication information, wherein the control information is received via a multicast control channel (MCCH) and a multicast channel (MCH).

10. The method of claim 9, wherein the MCCH is a logical channel and the MCH is a transport channel.

11. The method of claim 9, wherein the control information is received through a data region.

12. The method of claim 9, wherein the indication information further includes resource information through which the control information is transmitted.

13. The method of claim 12, wherein the indication information further includes a transport format indication of the control information.

14. The method of claim 9, wherein the control information is received from the network through resources designated by system information.

15. The method of claim 9, the indication information is periodically received from the network.

16. The method of claim 9, wherein the MBMS related identifier is an MBMS identifier or an MBMS group identifier.

* * * * *